April 7, 1936.  E. D. JOHNSON  2,036,700
VEHICLE CONTROL MECHANISM
Filed May 29, 1933
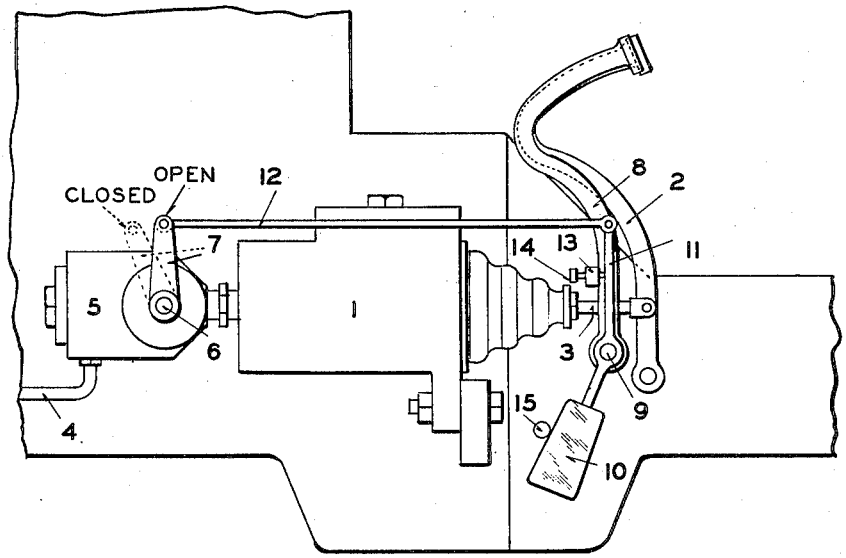
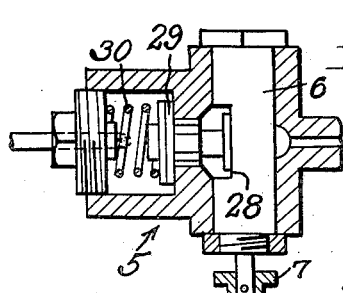
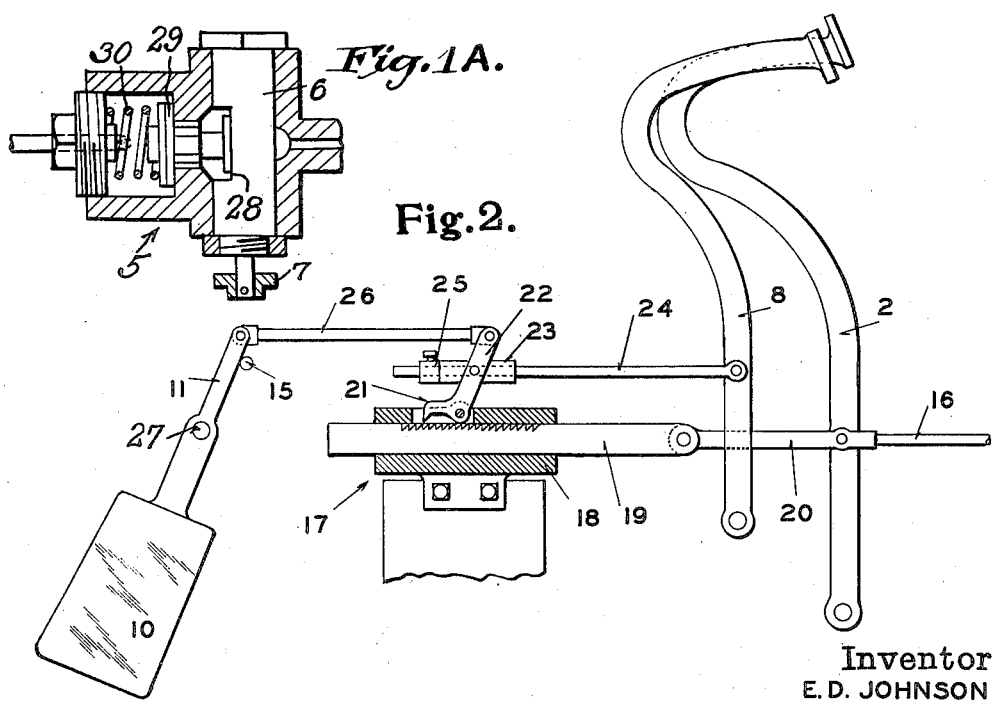
Inventor
E.D. JOHNSON
By E. E. Huffman
Att'y.

Patented Apr. 7, 1936

2,036,700

UNITED STATES PATENT OFFICE 2,036,700

VEHICLE CONTROL MECHANISM

Edward D. Johnson, St. Louis, Mo., assignor to Wagner Electric Corporation, St. Louis, Mo., a corporation of Delaware Application May 29, 1933, Serial No. 673,337

17 Claims. (Cl. 192—13)

My invention relates to the control of a motor vehicle and more particularly to means for holding the vehicle from rolling on an incline without the necessity of constantly maintaining the brakes in applied position by the use of manual effort.

One of the objects of my invention is to provide a vehicle with automatically operable means for holding the vehicle from rolling on an incline after it has been brought to a stop, said means being inoperative when the vehicle is decelerating.

Another object of my invention is to provide pendulum-controlled means for preventing the release of the brakes of a vehicle from applied position.

Still another object of my invention is to provide a braking system with automatically operable means for preventing the release of the brakes from applied position when the vehicle is stopped and the clutch mechanism is in disengaged position, said means being inoperative when the clutch mechanism is in engaged position, or when the vehicle is decelerating and the clutch mechanism is in disengaged position.

A more specific object of my invention is to provide pendulum-controlled means for preventing release of the brakes from applied position, the pendulum being inoperative to actuate said means when the clutch is in engaged position, or when the clutch is in disengaged position and the vehicle is decelerating.

Other objects of my invention will become apparent from the following description taken in connection with the accompanying drawing in which Figure 1 is a view showing my invention applied to a vehicle equipped with fluid-actuated brakes; Figure 1-A is a cross sectional view of the holding valve; and Figure 2 is a view showing my invention applied to a vehicle equipped with mechanically-actuated brakes.

Referring in detail to Figure 1, I have shown one way in which my invention may be applied to a motor vehicle having a hydraulic braking system. The numeral 1 indicates the usual compressor or master cylinder of a hydraulic brake system, the piston of which is adapted to be actuated by the brake pedal 2 and the piston rod 3. The conduit 4 leading from the compressor to the brake shoe actuating motors (not shown) is provided with a valve 5 having an operating shaft 6 and an operating arm 7. The operating shaft 6 of the valve is provided with a cam surface 28 for controlling the movable valve element 29 which is biased toward its seat by spring 30.

The valve 5, as shown, is similar to that disclosed in the application of Walter R. Freeman, Serial No. 641,832 filed November 9, 1932, although other types may be used. The purpose of this valve is to permit flow of liquid under pressure from the compressor to the brake motors but not in reverse direction, when the valve is closed, and to permit free passage of liquid in both directions when the valve is open. Thus when the valve is closed, the brakes may be applied and will be held in applied position or, if the brakes have already been applied before the valve is closed, they will be prevented from being released.

The clutch pedal 8 is secured to the clutch shaft 9 for operating the power transmission clutch in the well known manner. The position of the clutch pedal shown, is its position when the clutch is engaged. The end of the clutch shaft 9 has freely pivoted thereon a pendulum 10 provided with an extension 11 extending above the shaft and adjacent the clutch pedal. The upper end of this extension is connected to the operating arm 7 of the valve by a rod 12. The clutch pedal carries a projection 13 having an adjusting screw 14 adapted to engage the extension 11 of the pendulum. When the clutch pedal 8 is in clutch-engaged position, as shown, the valve is held in open position and the pendulum is held in a position ahead of the position which gravity would cause it to assume. A stop 15 is provided ahead of the pendulum for preventing it from swinging forward to a position where the valve would be moved past its open position.

In operation, when the clutch is in engaged position, the valve will be maintained open and the brakes may be applied and released at will. If the clutch is disengaged and the brakes applied, as for example, in stopping the vehicle on an up-grade, and maintaining it in such position prior to again starting, the brakes will be held in applied position by the closing of the valve through the action of gravity bringing the pendulum toward its vertical position (the position in which the line through the pivot 9 and the center of gravity of the pendulum is vertical). Reengagement of the clutch moves the pendulum to the position shown, opens the valve, and permits the brakes to be released. It is thus seen that with the brakes applied and the clutch disengaged, the operator of the vehicle may maintain the brakes applied and release them solely by the use of the clutch pedal, thus permitting the right foot to be used to operate other devices, as for example, the accelerator pedal. This simplified operation in maintaining the brakes applied and releasing the brakes and engaging the clutch by a single pedal, is highly useful in starting the vehicle on an upgrade without stalling the engine or permitting the vehicle to roll backward.

It is desirable to be able to apply and release the brakes at will while the vehicle is moving even though the clutch be disengaged, and the use of a pendulum to control the means for preventing release of the brakes from applied position is advantageous in that it maintains the valve in open position when the vehicle is decelerating, regardless of the position of the clutch pedal. As soon as the vehicle begins to decelerate as the result, either of the brakes being applied or of the friction and compression of an idling engine, or both, the inertia of the pendulum will cause it to be held against the stop 15, thereby maintaining the valve open as long as the inertia of the pendulum is capable of preventing gravity from rotating the pendulum counterclockwise toward its vertical position.

Referring to Figure 2, I have shown one way of applying my invention to brakes which are mechanically actuated and are provided with means for preventing the release of the brakes from an applied position. The brake pedal 2 actuates the brakes (not shown) in the usual manner by means of the rod 16. A brake holding mechanism 17 is secured to a fixed part of the vehicle forwardly of the brake pedal. This mechanism comprises a guide member 18 in which is slidable a toothed member 19 adapted to be moved by the brake pedal through the connecting rod 20 and which cooperates with the detent 21. The detent 21 is pivoted on the guide member 18 and the extension arm 22 thereof is pivotally connected by means of the member 23 with the clutch-actuated rod 24. The rod 24 has relative movement with the member 23 but is provided with an adjustable collar 25 whereby the detent will be held out of engagement with the toothed member 19 when the clutch is engaged, as shown. The extension 11 of the pendulum 10 pivotally mounted at 27 is connected to the arm 22 of the detent by a rod 26. When the detent is inoperative, the pendulum is held forwardly of the vertical and adjacent the stop 15.

In operation, when the clutch pedal is in the clutch engaged position, the detent is inoperative and the pendulum is held in a forward position, thus permitting free application and release of the brakes by the brake pedal. When the clutch is disengaged, the detent is moved to an operative position by the pendulum unless the deceleration of the vehicle is such as to maintain the pendulum in a forward position and the detent inoperative.

Having fully described my invention, what I claim as new and desire to secure by Letters Patent of the United States is:

1. In a motor vehicle provided with a clutch mechanism and with means for holding said vehicle from moving, means operable in response to gravity and the deceleration of the vehicle for governing the control of said holding means, and means for causing said gravity means to be inoperable when the clutch mechanism is engaged position.

2. In a motor vehicle provided with a clutch mechanism and with means for holding said vehicle from moving, a pendulum, and means operable in response to different positions of said pendulum for governing said holding means, and means for causing said pendulum to be inoperable when the clutch mechanism is in engaged position.

3. In a motor vehicle provided with a braking system, gravity-controlled means for preventing the release of the brakes from applied position, and manually operable means for preventing said first named means from being controlled by gravity.

4. In a motor vehicle provided with clutch mechanism and with a braking system, gravity-controlled means for preventing release of the brakes from applied position, and means for causing said gravity-controlled means to be inoperative when the clutch mechanism is in engaged position.

5. In a motor vehicle provided with clutch mechanism and with a braking system, pendulum-controlled means for preventing the release of the brakes from applied position, and means operable when the clutch mechanism is in engaged position for disabling said means.

6. In a motor vehicle provided with a braking system, means for preventing release of the brakes from applied position, gravity-actuated means for operating said release preventing means, said gravity-actuated means being inoperative under the influence of deceleration of the vehicle, and manually-actuated means for preventing said gravity-actuated means from being actuated by gravity.

7. In a motor vehicle provided with clutch mechanism, a braking system, means for preventing the release of the brakes from applied position, a pendulum for operating said release preventing means, and means operable when the clutch is in engaged position for disabling said pendulum.

8. In a motor vehicle provided with clutch mechanism, a fluid braking system and valve means for preventing the release of the brakes from applied position, a pendulum for closing said valve, and means for holding said pendulum in a position to maintain said valve in its open position when the clutch mechanism is in engaged position.

9. In a motor vehicle provided with clutch mechanism, a braking system, and means for preventing the release of the brakes from applied position, of a pendulum for operating said release preventing means, said pendulum being operative only when the clutch is in disengaged position.

10. In a motor vehicle provided with a clutch pedal, a braking system, and means for preventing release of the brakes from applied position, of a pendulum, a connection between the pendulum and the release preventing means; and means on the clutch pedal for holding said pendulum in a position to maintain said release preventing means inoperative when the clutch pedal is in clutch engaging position.

11. In a motor vehicle provided with a fluid braking system, a valve for preventing release of the brakes from applied position, gravity-controlled means for operating said valve, and manually operable means for preventing said gravity-controlled means from operating the valve.

12. In a motor vehicle provided with a braking system, means for preventing release of the brakes from applied position, means operable by the deceleration of the vehicle for maintaining said release preventing means in an inoperative position and operable by gravity when the vehicle is stationary for maintaining said release preventing means in an operative position, and manually-controlled means for preventing said second named means from being operated by gravity.

13. In a motor vehicle provided with brakes and means for applying the brakes, means acting on the applying means for preventing release of the brakes from applied position notwithstanding the brake applying effort effective on the applying means to apply the brakes has been released to normally release the brakes, and a pendulum for operating said release preventing means, said pendulum being mounted to swing in a longitudinal plane of the vehicle and adapted during deceleration of the vehicle to hold the release preventing means in inoperative position.

14. In a fluid braking system for motor vehicles, means for applying the brakes, valve means acting on the applying means for preventing release of the brakes from applied position notwithstanding the brake applying effort effective on the applying means to apply the brakes has been released to normally release the brakes, and gravity-controlled means for controlling said valve.

15. In a motor vehicle provided with brakes, means for applying the brakes and connections between the applying means and the brakes, means for preventing release of the brakes from applied position, said means comprising means operable by deceleration of the vehicle for maintaining said release preventing means in inoperative position and operable by gravity for maintaining said release preventing means in operative position, said release preventing means being effective on said brakes even if the brake applying means is permitted to assume non-brake applying position after the brakes have been applied.

16. In a fluid braking system for motor vehicles, a source of fluid pressure, a brake actuating motor, a conduit connecting the source of pressure and the motor, valve means cooperating with the conduit for preventing release of the brakes from applied position, and gravity-controlled means for controlling said valve.

17. In a fluid braking system for motor vehicles, a source of fluid pressure, a brake actuating motor, a conduit connecting the source of pressure and the motor, and valve means cooperating with the conduit for preventing release of the brakes from applied position, said valve means comprising an element subject to gravity and to inertia and movable by gravity to close the valve, said element being subject to sufficient inertia under a predetermined rate of deceleration of the vehicle to cause the valve to be in open position.

EDWARD D. JOHNSON.